United States Patent [19]
Wright et al.

[11] Patent Number: 5,161,877
[45] Date of Patent: Nov. 10, 1992

[54] HEADLAMP ADJUSTER MECHANISM

[75] Inventors: David J. G. Wright, Guntersville, Ala.; David Goss, Rockford, Ill.

[73] Assignee: Textron Inc., Providence, R.I.

[21] Appl. No.: 800,536

[22] Filed: Nov. 27, 1991

[51] Int. Cl.[5] .......................................... B60Q 1/06
[52] U.S. Cl. .................................... 362/66; 362/421; 362/424
[58] Field of Search .................. 362/66, 69, 273, 289, 362/421, 422, 424

[56] References Cited

U.S. PATENT DOCUMENTS

| | | | |
|---|---|---|---|
| 4,665,469 | 5/1987 | Furfari et al. | 362/66 |
| 4,674,018 | 1/1987 | Ryder et al. | 362/424 |
| 4,689,725 | 8/1987 | Saijo et al. | 362/66 |
| 4,713,739 | 12/1987 | Ryder et al. | 362/424 |
| 4,796,494 | 1/1989 | Eckenrode et al. | 81/484 |
| 4,843,523 | 6/1989 | Nakamura | 362/69 |
| 4,882,658 | 11/1989 | Allen | 362/69 X |
| 4,893,219 | 1/1990 | Lisak | 362/66 |
| 4,916,587 | 4/1990 | Hirose et al. | 362/66 |

Primary Examiner—Stephen F. Husar
Attorney, Agent, or Firm—Trexler, Bushnell, Giangiorgi & Blackstone, Ltd.

[57] ABSTRACT

A headlamp adjuster mechanism for use with a headlamp for controlling movement thereof comprises a housing. Gear means is disposed within the housing. The gear means comprises an adjusting member connected to the gear means for movement in response to rotation of the gear means, and is operatively connected to the headlamp for attaining controlled positioning thereof. Elastomeric braking means is disposed in engagement with at least one of the gear means and the adjusting member for providing prevailing torque for the mechanism to prevent inadvertent movement of the components of the gear means. The braking means is engaged at the outer periphery of the gear means to increase the moment arm associated with the force applied by the braking means such that a desired degree of prevailing torque can be attained. Further, the manner and component designs for attaining prevailing torque are such that the desired degree of said torque can be attained in each adjuster mechanism.

19 Claims, 2 Drawing Sheets

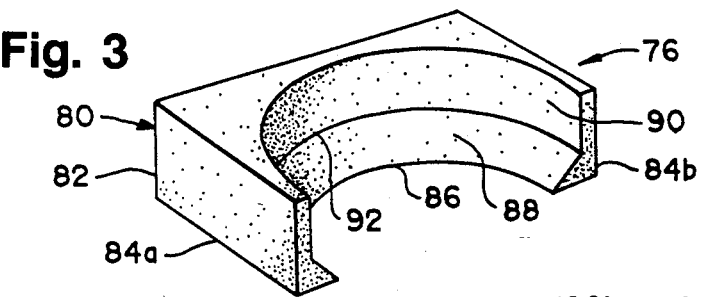
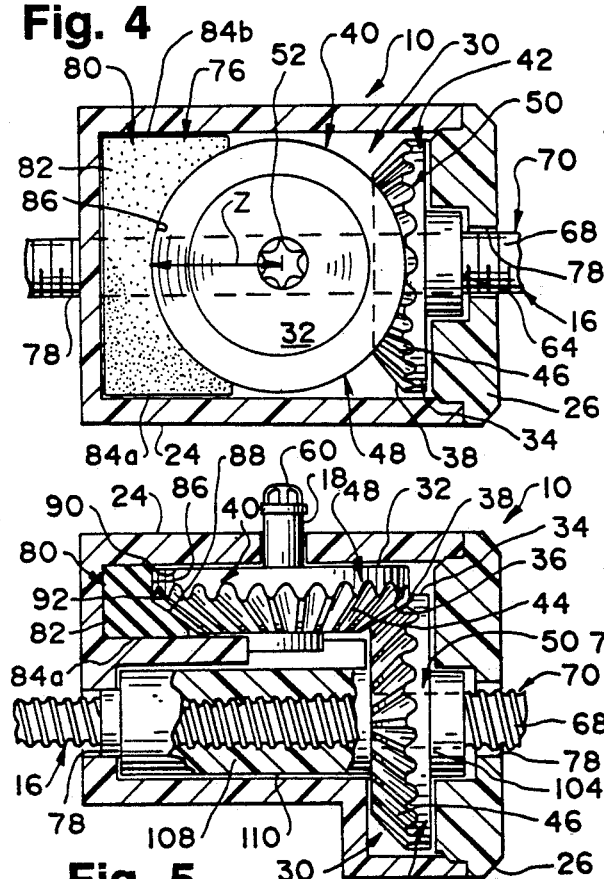
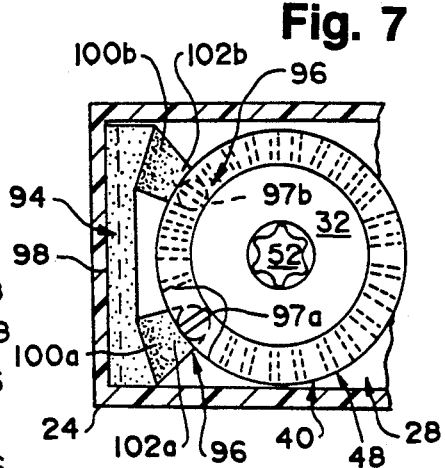
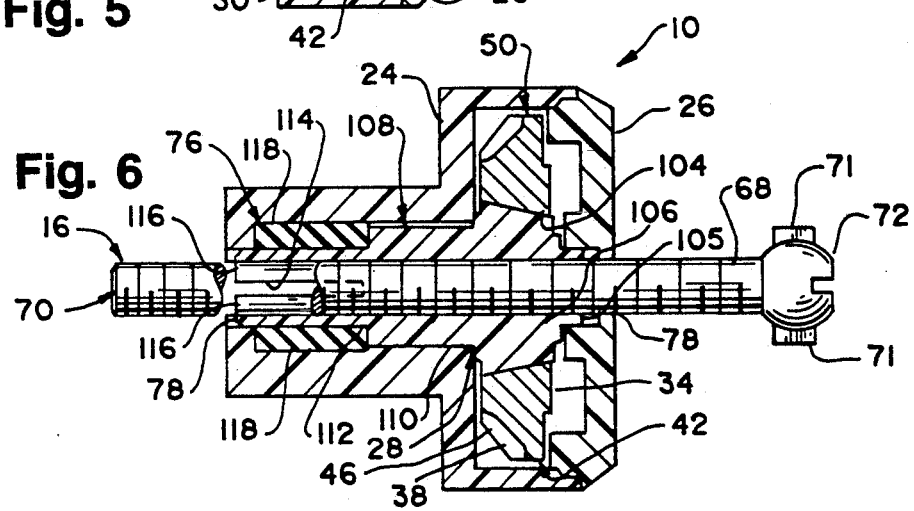

HEADLAMP ADJUSTER MECHANISM

BACKGROUND AND SUMMARY OF THE INVENTION

The present invention relates generally to an adjuster mechanism for automobile headlamps and the like, and relates more specifically to an improved gearbox construction for use with such mechanisms with novel means for providing a degree of prevailing torque.

Modern automobile constructions are designed to take advantage of aerodynamics and to present an aerodynamically efficient profile. Toward this goal, the old sealed beam headlamps have given way to composite headlamp constructions which merge smoothly with the aerodynamic profile of the car body. Also, these lamps employ improved, state-of-the-art lighting technology.

Because of the aerodynamic shape of the lamps, it is necessary that adjustment of the horizontal and vertical orientation of the headlamps take place from under the hood of the automobile.

As proper orientation of the automobile headlamps is essential to driving safety, these headlamps must retain the desired orientation during service. That is to say, the vibrations and jarring of the auto experienced in normal use must not vibrate the headlamps out of adjustment. Also, when misalignment occurs, it is necessary that an owner or mechanic can readily and easily re-adjust the headlamps to a proper orientation.

To provide and assure the desired headlamp orientation, headlamp adjuster mechanisms for the vertical and horizontal are normally provided for each headlamp. The construction and functionality of adjuster mechanisms for automobile headlamps and the like are well known to those skilled in the relevant art, as is evident, for example, by the following United States patents.

| Hirose et al. | 4,916,587 | 04/10/90 |
| Lisak | 4,893,219 | 01/09/90 |
| Allen | 4,882,658 | 11/21/89 |
| Nakamura | 4,843,523 | 06/27/89 |
| Eckenrode et al. | 4,796,494 | 01/10/89 |
| Ryder et al. | 4,713,739 | 12/15/87 |
| Saijo et al. | 4,689,725 | 08/25/87 |
| Ryder et al. | 4,674,018 | 06/16/87 |
| Furfari et al. | 4,665,469 | 05/12/87 |

These adjuster mechanisms function well. However, due to the vibration and jostling commonly attendant with driving a car, the adjuster mechanisms may move or rotate, and thereby change the orientation of the headlamp for a desired pre-set position. In order to prevent this from occurring, a source of prevailing torque is built into the mechanism. Prevailing torque is the term given to a form of resistive force or friction applied to one or more of the movable elements of the adjuster mechanism which overcomes any tendency of the components to vibrate out of position during normal service.

Means must be provided for applying some degree of prevailing torque to the adjuster mechanism. This means must be controllable and predictable in order to meet automobile manufacturer's exacting specifications, yet must permit movement or adjustment of the components as needed. The present invention provides a unique and improved means for applying the prevailing torque to an adjuster mechanism.

OBJECTS AND SUMMARY OF THE INVENTION

A general object of the present invention is to provide a new and improved headlamp adjuster mechanism.

A more specific object of the invention is to provide an improved headlamp adjuster mechanism having braking means whose elasticity and resiliency properties provide prevailing torque.

Another object of the present invention is to provide a headlamp adjuster mechanism which reduces the magnitude of braking force required to attain the desired degree of prevailing torque.

An additional object of the invention is to provide a headlamp adjuster mechanism which provides an increased radius for prevailing torque.

A further object of the present invention is to provide a headlamp adjuster mechanism which reduces torque variances by reducing the magnitude of the restraining force required to achieve the desired degree of prevailing torque.

Another object of the invention is to provide a headlamp adjuster mechanism having braking means having equal static and dynamic coefficients of friction.

An additional object of the present invention is to provide a headlamp adjuster mechanism which can control prevailing torque at more precise levels than other, currently available gearboxes.

A further object of the invention is to provide a headlamp adjuster mechanism having ratcheting means for applying prevailing torque.

A headlamp adjuster mechanism, constructed according to the teachings of the present invention, for use with an automobile headlamp adjusting apparatus, comprises a housing with gear means, an adjusting member is connected to the gear means for movement in response to rotation of the gear means, and is operatively connected to the headlamp for attaining controlled positioning thereof. Elastomeric braking means is disposed in engagement with the components of the adjuster mechanism for providing prevailing torque for the mechanism to prevent inadvertent movement of the components during normal use. This braking means is also positioned such that the point of application of the frictional force applied is radially outboard of the axis of rotation of the mmber against which it is engaged. As such, the amount of force required to attain the desired prevaiing torque is reduced with respect to prior designs, and is more readily controlled.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 3 is a perspective view of one form of elastomeric braking means for use in the adjuster mechanism of the present invention;

FIG. 4 is a sectioned plan view of the adjuster mechanism of FIG. 1;

FIG. 5 is a sectioned side view of the adjuster mechanism of FIG. 4;

FIG. 6 is a sectional view of an adjuster mechanism having another embodiment of the braking means;

FIG. 7 is a sectioned plan view of another embodiment of the braking means; and

FIG. 8 is a side, partially sectioned view of the braking means of FIG. 5.

DETAILED DESCRIPTION OF A PREFERRED EMBODIMENT

Figure 1:
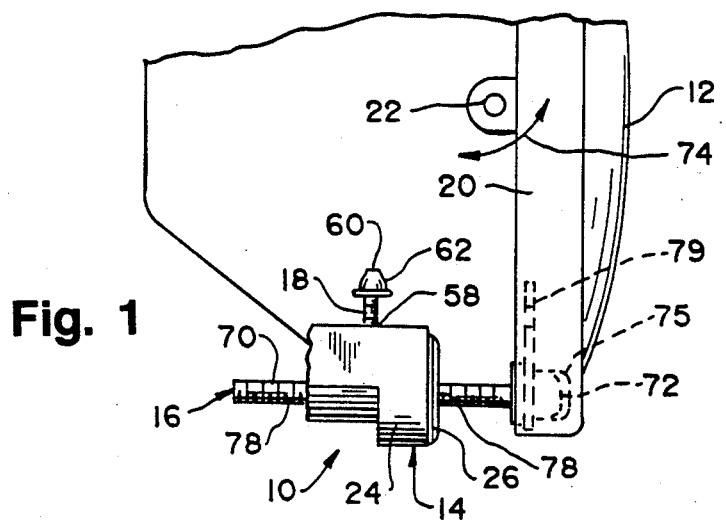
FIG. 1 is a somewhat schematic side elevational view of a headlamp adjuster mechanism, constructed according to the teachings of the present invention, connected to an automobile headlamp.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Referring initially to FIG. 1, a headlamp adjuster mechanism 10 for positively variably positioning a headlamp 12 is shown. The adjuster mechanism 10 is contained within a housing 14. The adjuster mechanism 10 has an adjusting member 16 or screw movably extending through the housing 14. The mechanism 10 also has a drive shaft 18 which extends through the housing 14 at a location substantially perpendicular to the adjusting member 16 for engagement by a suitable tool. Rotation of the drive shaft 18 will, as is well known, produce linear movement of the adjusting member 16 by means of internal gearing to pivot the headlamp 12.

The adjuster mechanism 10 is similar in construction and operation to the like kind apparatus disclosed in the United States Patent to Lisak, U.S. Pat. No. 4,674,018, and U.S. patent application, Ser. No. 07/517,232. The patent and application are assigned to the assignees of the present invention, and the disclosures thereof are incorporated herein by reference.

The adjusting member 16 is connected to a headlamp housing or frame 20 which surrounds at least a portion of the headlamp 12. The headlamp housing 20 may be of various forms, and includes a pivot bearing 22 about which the housing 20 may pivot. In this way, the movement of the adjusting member 16, due to the application of a torque to the drive shaft 18, effects the vertical positioning of the headlamp 12, as indicated by arrow 74. One or more additional adjuster mechanisms 10 can be provided to attain the horizontal positioning of the headlamp 12.

Figure 2:
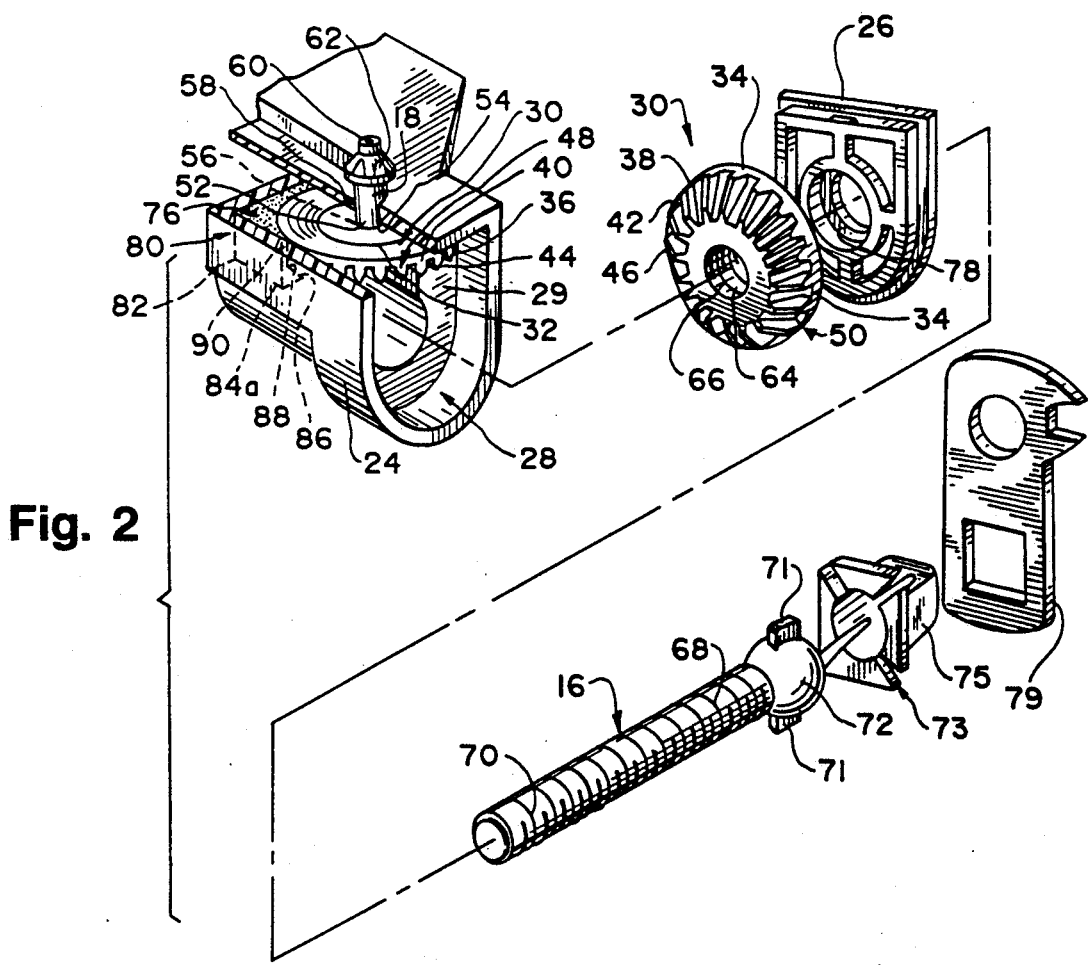
FIG. 2 is an exploded perspective view of the adjuster mechanism illustrated in FIG. 1 showing the elements thereof.

The elements of the adjuster mechanism 10 are illustrated in FIG. 2. The housing 14 can take on numerous forms, and is preferably composed of a molded plastics material. As shown, the housing 14 generally comprises a body 24 and a cap 26. The body 24 has a main cavity 28 for accepting other elements or components of the mechanism 10. The cavity 28 is closable by the cap 26, which can be ultrasonically welded in place to complete the construction of the mechanism 10 and to protect the other elements from the possibly adverse effects of the ambient environment.

The cavity 28 is of sufficient dimensions, and is specifically configured to accept gear means 30. The gear means 30 may vary in construction or design, but as illustrated comprises a drive gear 32 and an adjusting gear 34. The gears 32 and 34 are miter gears and are constructed for cooperating engagement at generally right angles, and are of the bevel-meshed type, well known in the relevant art.

The drive gear 32 itself has a plurality of teeth 36 which mesh with complementary teeth 38 on the adjusting gear 34. The cavity 28 has gear journaling bores or chambers 29 for journaling and supporting the gears 32 and 34 for rotation. The drive gear 32 and the adjusting gear 34 are journaled within the cavity 28 so that rotation of the drive gear 32 causes corresponding rotation of the adjusting gear 34.

The drive gear 32 and the adjusting gear 34 each have substantially circular peripheries 40 and 42, respectively. However, it is to be noted that while the teeth 36 and 38 project from the peripheries 40 and 42 in a substantially perpendicular fashion, each of the teeth 36 and 38 have sloping portions 44 and 46 which slope upwardly inward towards a center of the gears 32 and 34, respectively. The sloping portions 44 and 46 form braking surfaces 48 and 50 on the drive gear 32 and the adjusting gear 34, the significance of which will become more clear hereinafter.

The drive gear 32 has a centrally located recess or aperture 52 disposed axially. The aperture or recess 52 accepts a multilobular end 54 on the drive shaft 18. Thus, torque applied to the drive shaft 18 by an appropriate tool, not shown, is transmitted to the drive gear 32. In this way, a torque applied to the drive shaft 18 causes rotation of the gear means 30, which as will be discussed, produces linear movement of the adjusting member 16.

Because it is desirable to access the drive shaft 18 from the exterior of the mechanism 10, a hole 58 is provided through the housing 14. The hole 58 is located so that the received end 54 can enter and couple with the recesses 56 on the drive gear 32 when the same is properly journaled within the housing 14. A distal end 60 of the drive shaft 18 has tool engaging surfaces 62 thereon configured to complement a corresponding configuration on the tool. Thusly, the distal end 60 extends away from the housing 14 where it is engagable by the tool to receive a torque therefrom to cause rotation of the gear means 30.

The adjusting gear 34 also has a centrally located aperture in the form of an internally threaded bore 64 extending latitudinally through the gear 34. The bore 64 is threaded to accept the adjusting member 16. Threads 66 in the bore 64 are constructed to mate with complementary threads 68 on the adjusting member 16. Thus, when the gear means 30 rotates, the threads 66 and 68 interact in common fashion to attain linear movement of the adjusting member 16, as this member is fixed against rotation as noted hereinafter.

More specifically, the end of the adjusting member 16 includes a ball portion 72 having a pair of ears 71. The ball portion 72 is disposed within a socket member 75 having slats 73 for flexibility and to receive the ears 71. The disposition of the ears 71 in slats 73 precludes rotation of the adjusting member 16 with respect to the socket member 75. Thus, when the adjusting gear 34 is rotated, the engaged threads 66 and 68 will cause the adjusting member 16 to move linearly. The socket 75 is engaged in an aperture 77 in a bracket 79 affixed to the headlamp frame. Thus, movement of the member 16 will produce movement of the headlamp 12 as indicated by arrow 74.

In the embodiment of FIG. 2, the adjusting member 16 is threadedly connected directly to the internally threaded bore 64 of the adjusting gear 34. This is but one arrangement for connecting the adjusting gear 34 to the adjusting member 16. An alternative form is discussed in detail in U.S. Pat. No. 4,674,018, noted above, and as shown in FIGS. 5 and 6.

More specifically, as will be discussed, a plastic sleeve or bushing 108 is provided, FIGS. 5 and 6, which is coupled to the adjusting gear 34 and includes a bore in which the adjusting member 16 is engaged. This bore in the bushing 108 is threaded, and since the bushing 108 is coupled or keyed to the adjusting gear 34, the bushing 108 will rotate with the gear 34.

As discussed above, it is necessary with all adjusters of this type to provide some degree of "prevailing torque." With the prior art constructions, including that of U.S. Pat. No. 4,674,018, prevailing torque was often obtained by having considerable frictional engagement between the threads on the adjusting member 16 and those on the plastic bushing 108. This was attained by having the male threads on the adjusting member 16 cold form the female threads on the bushing 108 during initial assembly. Unfortunately, however, this prior art arrangement for attaining prevailing torque did not always function well in service and it was difficult to control the amount of prevailing torque in the system.

More specifically, the frictional engagement between the threads tended to dissipate with continued use. Also, repeated or consistent prevailing torque values were difficult to attain from adjuster to adjuster. Also, since the point of engagement of the frictional contact was relatively close to the axis of rotation of the adjusting member, in order to attain a prevailing torque X with a force Y, force Y had to be of relatively high magnitude as the moment arm Z (viz., the distance from the axis of rotation to the point of application of force Y) is relatively short, where, generically, Prevailing Torque (X)=Applied Force (Y)—multiplied by—Moment Arm (Z). With the present invention, as will be discussed hereinafter, the point of application of the force Y is moved radially outboard with respect to the axis of rotation of the engaged component. As such, a lesser force can be employed, and greater control attained.

In addition, a unique and novel approach to the application of prevailing torque is employed, where the force is applied by a resilient elastomeric member having substantial memory qualities, so that the force to be applied can be controlled and maintained at a relatively uniform value throughout the service life of the adjuster. Due to the length of the threaded shank 70, apertures 78 of dimensions sufficient to accept the shank 70 are disposed through opposite sides of the housing 14 so that the adjusting member 16 can extend through the housing 14. The head portion 72 is located distant from the housing 14, and is connected to the headlamp housing 20 in a manner as described above.

It is to be noted that different constructions of the housing 14, the drive shaft 18, gear means 30, housing 20, and the adjusting member 16 can be utilized without departing from the teachings of the present invention. Therefore, it is to be clearly understood that the scope of the invention is not to be limited to employment with a particular housing 14, drive shaft 18, gear means 30, or adjusting member 16.

Attention is now directed to the novel features of the adjuster mechanism 10 which provides improved operating characteristics in attaining the desired prevailing torque, and which are illustrated in FIG. 2 and FIG. 3. This element is the braking means 76. The braking means 76 generally comprises a shoe 80 formed from an elastomeric or polymeric material having a high degree of resiliency and memory, and which can be formed by a molding process.

As used herein, the term "elastomer" may be defined as any of a broad category of various polymers having elastic properties of natural rubber, with a high degree of memory, that is the ability or tendency to return to its original shape or form following deformation. While some examples of elastomers which have been experimental in conjunction with the present invention are listed hereinafter by common tradenames and manufacturer, the list of acceptable elastomers is vast and continues to grow. It is only necessary that the elastomer have proper hardness and compression set and sufficinet memory to perform in the intended manner. Some examples of elastomers tht have been tried are: Kraton, manufactured by Shell Chemical Company; Estane, manufactured by B.F. Goodrich Co.; Hytrel, manufactured DuPont and Santoprene manufactured by Monsanto. The shoe 80 is preferably composed of an elastomeric material having substantially equal static and dynamic coefficients of friction. This type of elastomeric material is desirable because its elasticity and memory of resiliency properties allow it to act as an effective brake for providing the adjuster mechanism 10 with a desired level of prevailing torque, thereby resulting in the above-described benefits. Accordingly, the shoe 80 is intended to be disposed in engagement with the outer peripheral portion of at least one of the gear means 30 and the adjusting member 16 to provide the prevailing torque thereto.

The configuration of the shoe 80 is illustrated in FIG. 3. The shoe 80 has a substantially linear base portion 82 from which projections 84a and 84b extend substantially perpendicularly on either end of the base portion 82. The projections 84a and 84b extend a certain distance away from the base 82 defining a line corresponding to a chord of the gears 32 and 34. The projections 84a and 84b are joined by a substantially arcuate portion 86 which extends across the length of the base 82 from one projection 84a to the other projection 84b. The arcuate portion 86 defines and arc of approximately one hundred and eighty degrees.

The base 82 has a thickness substantially equal to the thickness of the gears 32 and 34. Thus, the shoe 80 is capable of engaging the gears 32 and 34 along the entire thickness of a substantial portion of the outer periphery 40 and 42, respectively.

However, the arcuate portion 86 has a sloped or beveled portion 88 and a linear portion 90. These portions 88 and 90 actually engage the correspondingly shaped outer periphery of the gears 32 and 34. The portions 88 and 90 give the shoe 80 a substantially half-funnel shaped latitudinal cross section. The sloped portion 88 begins at one side of the projections 84a and 84b and slopes upwardly towards the base 82 along the arcuate portion 86. The sloped portion 88 extends to a location 92 approximately halfway along the thickness of the shoe 80 and the base 82.

The location 92 marks the demarcation between the sloped portion 88 and the linear portion 90. The linear portion 90 extends from the location 92 to the side of the shoe 80 opposite to the side adjacent the sloped portion 88 in a substantially perpendicular fashion. The sloped portion 88 and the linear portion 90 define a configuration which complements a configuration of the peripheries 40 and 42 on the drive gear 32 and the adjusting gear 34. Thus, the shoe 80 can be compressed slightly and engaged with the gear means 30 to supply the prevailing torque.

The shoe 80 is inserted into the housing 14 in a position allowing the shoe 80 to engage the gear means 30, as shown in FIG. 4. The shoe 80 engages the drive gear 32 so that the sloped portion 88 engages the sloping portions 44. While the shoe 80 is shown engaging the drive gear 32, it is to be noted that the shoe 80 can engage the adjusting gear 34 instead. Also, another shoe 80 can be provided for engaging the adjusting gear 34.

The shoe 80 is formed from an elastomeric material having a high degree of memory and resiliency. Thus, upon assembly the braking means 76 or shoe 80 is compressed so that upon final assembly the memory or resilient properties thereof will tend to return the shoe 80 to its original shape, thus producing frictioned engagement between the shoe 80 and the associated gear 32. This frictional engagement constitutes the force Y and is multiplied by the moment arm Z which is the distance from the axis of rotation to the periphery of the gear 32, where the force Y is applied, thus giving the prevailing torque.

Thus, since the nature and dimension of the shoe 80 can be controlled, the degree of frictional force applied not only can be controlled, but also will be constant from unit to unit. Further, with respect to the prior art concepts discussed above, the increased length of the moment arm permits a lesser force to be used to attain the same degree of prevailing torque.

The elastomeric shoe 80 represents a significant improvement over the adjuster mechanisms of the prior art. Specifically, the shoe 80 contacts the gear means 30 along a major portion of the peripheries 40 and 42. Engagement about the gear periphery increases the radius or moment arm associated with the prevailing torque, as compared to prior art devices. By increasing this radius, the magnitude of the force required for prevailing torque to be applied by the shoe 80 to the gear means 30 is reduced. Thus, the same magnitude of prevailing torque can be applied to the gear means 30 by a smaller force. This effectively reduces torque variances by reducing the magnitude of the force. Additionally, the shoe 80 allows the prevailing torque to be controlled at more precise levels, facilitating compliance with automobile manufacturers' specifications.

FIG. 7 and FIG. 8 illustrate a second embodiment of the braking means concept discussed above in the form of a body 94 for providing prevailing torque. The body 94 is substantially U-shaped and has ratcheting means 96. The body 94 is preferably molded from a polymeric compound, such as a plastic and the like. The ratcheting means 96 is in the form of fingers 97a and 97b which engage the gear teeth on one or the other of the gear means 30. The polymeric compound must have sufficient flexibility and resiliency to allow the fingers 97a and 97b to flex in and out of engagement with the teeth 36 and 38 on the gear means 30 as the gears rotate.

The body 94 comprises a base portion 98 having a height substantially equal to a thickness of the gear means 30. The body 94 has a length approximately equal to a diameter of the gears 32 and 34. Projecting members 100a and 100b extend away from the base portion 98 at opposite ends thereof a certain distance in a substantially perpendicular fashion. At the juncture between the base portion 98 and the projecting members 100a and 100b, the projecting members 100a and 100b have sloping sides causing the projecting members 100a and 100b to approach each other as they extend downwardly as viewed in FIGS. 7 and 8.

At an end of the projecting members 100a and 100b opposite to the base portion 98, finger support members 102a and 102b are provided, respectively, each of which depends downwardly from the projecting members 100a and 100b sloping away from the base portion 98. The juncture between the projecting members 100a and 100b and the finger support members 102a and 102b is resiliently flexible to allow the ratcheting means 96 to function properly.

The fingers 97a and 97b or detents extend away from an end of the finger support members 102a and 102b opposite to the projecting members 100a and 100b away from the base portion 98. The fingers 97a and 97b are substantially perpendicular to the projecting members 100a and 100b. The fingers 97a and 97b are of dimensions sufficient to allow them to be disposed between the adjacent teeth 36 on the gear 32.

The fingers 97a and 97b are shown in FIG. 7 and FIG. 8 engaging only the drive gear 32. However, it is to be noted that the fingers 97a and 97b can be utilized with the adjusting gear 34 in a fashion similar to that described above with respect to the shoe 80.

The body 94 and its various components 97, 100, and 102 are formed from a polymeric material having a high degree of resiliency and stiffness. Also, as was the case with respect to the embodiment of FIGS. 1 through 5, the force Y is being applied at the outer radial periphery of the gear 32. Thus, the fingers 97a and 97b engage the gear teeth 36, and they provide prevailing torque to the adjuster mechanism 10. The fingers 97a and 97b provide the prevailing torque by resisting rotation of the gear 32 by friction generated by the interference between the fingers 97a and 97b and adjacent teeth 36.

When a torque is properly applied to the drive shaft 18 to adjust the headlamp 12, the fingers 97a and 97b will flex out of engagement with the adjacent teeth 36 to allow for rotation of the gear means 30. The flexibility of the polymeric compound facilitates this flexing, however, due to the resiliency or memory in said compound, the fingers 97a and 97b flex back into another space behind a single tooth after that tooth has passed the fingers 97a and 97b. In this way, the application of prevailing torque to the mechanism 10 is continuous, independent of the positioning of the headlamp 12.

Yet another embodiment of the braking means of the present invention is illustrated in FIG. 6. This embodiment is substantially similar to the above-disclosed embodiments, except for the differences to be noted in the following paragraphs.

When this embodiment is used, the construction of the adjusting gear 34 is changed. Specifically, the adjusting gear 34 now has a bore 104 extending axially therethrough having a polygonal internal configuration. This particular bore 104 is constructed to complement the configuration of and accept a multilobular portion 106 on a bushing 108 having an axial bore 105 therethrough sufficient to accept the adjusting member 16. This interconnection between gear 34 and bushing 108 permits effective torque transfer from the adjusting gear 34 to the adjusting screw member 16.

The bushing 108 is preferably formed from a molded plastics material, and has a shank 110. The shank 110 is substantially cylindrical in shape and the bore 105 extends axially through the shank 110. The multilobular portion 106 is disposed on one end of the shank 110 with a reduced diameter portion 112 disposed on the other end thereof. The multilobular portion 106 forms a keyed engagement with the adjusting gear 34 when properly inserted into the bore 104.

The bore 105 is internally threaded. The threaded portion may extend the entire axial length of the bore 105, or may occupy only a subset of that length. The threaded portion is constructed to accept the threads 68 on the adjusting member 16. The reduced portion 112 has an outer diameter somewhat smaller than a corresponding diameter of other portions on the shank 110. In a preferred embodiment, the threaded portion does not extend along the reduced portion 112.

However, a pair of diametrically opposed slit 114 extend longitudinally from the end of the shank 110 defined by the reduced portion 112 along substantially the entire length of the reduced portion 112. The slits 114 extend from the bore 105 through the shank 110. Preferably, there are at least two slits 114 on the shank 110 spaced in diametric opposition along the circumference of the reduced portion 112. The slits 114 define opposing subset portions 116. Due to the inherent resiliently flexible nature of the material comprising the bushing 108, the subset portions 116 are compressible against the adjusting member 16 when disposed within the bore 105.

The braking or prevailing torque effect is provided by an elastomeric member 118. The elastomeric member 118 is composed of a material substantially identical to the elastomeric material comprising the embodiment of FIGS. 1 through 5. The member 118 is substantially in the form of a hollow cylinder having an inner diameter sufficient to accept the reduced portion 112. The member 118 has a height substantially equal to the axial length of the reduced portion 112 so that the member 118 can cover substantially the entire circumference defined by the reduced portion 112 when applied thereto.

During construction of the mechanism 10 with the member 118, the member 118 is slid onto the reduced portion 112, thereby covering it as well as the slit 114. The cap 26 is ultrasonically welded onto the body 24 to form the housing 14.

As the cap 26 is applied, all of the components of the adjuster are moved axially to the left as viewed. The initial length of the elastomeric sleeve 118 is selected so that it is greater than the axial space provided to accommodate this sleeve 118. Thus, upon finished assembly, the sleeve 118 is compressed axially a sufficient degree to cause the sleeve 118 to apply radially inwardly directed forces to the segments 116 of the reduced diameter portion 112. This causes the segments 116 to flex inwardly and to engage frictionally the adjusting member 16. This frictional engagement provides the desired degree of prevailing torque on the adjusting member 16.

Further, since the size or dimension of the sleeve 118 can be determined and designed into the units as can the volume of the space into which the sleeve 118 is compressed, the amount of frictional force applied to the adjusting member 16 can be controlled and predetermined. Also, as the sleeve 118 is formed of an elastomeric material with a high degree of memory and resiliency, the prevailing torque will not diminish in service and will be relatively constant from unit to unit.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

THE INVENTION CLAIMED IS:

1. A headlamp adjuster mechanism for use with a headlamp for controlling movement thereof comprising: a housing; gear means disposed within the housing; an adjusting member connected to the gear means for movement in response to rotation of the gear means and being operatively connected to the headlamp for attaining controlled positioning thereof; and elastomeric braking means disposed in engagement with at least one of the components of the headlamp adjuster mechanism for providing prevailing torque for the mechanism to prevent inadvertent movement of the components of the gear means.

2. A headlamp adjuster mechanism as defined in claim 1 wherein the elastomeric braking means engages a gear component of the gear means.

3. A headlamp adjuster mechanism as defined in claim 2 wherein the gear has an external configuration; the braking means has a configuration which complements the external configuration; and the braking means is disposed on the external configuration.

4. A headlamp adjuster mechanism as defined in claim 1 wherein the adjusting member comprises a screw.

5. A headlamp adjuster mechanism as defined in claim 1 wherein the braking means comprises an elastomeric shoe.

6. A headlamp adjuster mechanism as defined in claim 5 wherein the shoe comprises a body having an arcuate portion conforming to an external configuration of the gear means.

7. A headlamp adjuster mechanism as defined in claim 1 wherein the elastomeric braking means engages a gear component of the gear means and said engagement takes place at the external periphery of the gear component.

8. A headlamp adjuster mechanism as defined in claim 1 further comprising an internally threaded bushing connected to the gear means; the bushing having a bore therein sufficient to accept the adjusting member and a slotted flexible portion; and the braking means being disposed on the bushing.

9. A headlamp adjuster mechanism as defined in claim 8 wherein the bushing has slots therein defining subset portions of the bushing; and the braking means capable of applying pressure to the bushing for constricting the slots and compressing the subset portions together to apply prevailing torque to the adjusting member.

10. A headlamp adjuster mechanism as defined in claim 8 wherein ultrasonic vibrations form the housing; and spring energy is imparted to the braking means by the ultrasonic vibrations.

11. A headlamp adjuster mechanism as defined in claim 1 wherein the braking means comprises an elastomer having equal static and dynamic coefficients of friction.

12. A headlamp adjuster mechanism as defined in claim 1 wherein the braking means is disposed on at least one of the adjusting member and the gear means so as to provide an increased radius associated with prevailing torque.

13. A headlamp adjuster mechanism as defined in claim 1 wherein the braking means has ratcheting means for providing prevailing torque.

14. A headlamp adjuster mechanism as defined in claim 13 wherein the ratcheting means comprises fingers for applying a prevailing torque to the gear means.

15. A headlamp adjuster mechanism as defined in claim 14 wherein the ratcheting means comprises a polymeric component.

16. A headlamp adjuster mechanism for use with a headlamp for controlling movement thereof comprising: a housing; gear means disposed within the housing; the gear means being operatively connected to the headlamp for attaining controlled positioning thereof; and elastomeric braking means disposed in engagement with the gear means for providing prevailing torque for the mechanism to prevent inadvertent movement of the gear means.

17. A headlamp adjuster mechanism as defined in claim 16 wherein the gear means includes an adjusting member; the braking means being operatively engagable with the adjusting member for providing prevailing torque.

18. A headlamp adjuster mechanism as defined in claim 16 further comprising an internally threaded bushing connected to the gear means; the bushing having a reduced portion thereon; a slit disposed on the reduced portion; subset portions of the reduced portion being defined by the slit; the braking means being located on the reduced portion; and the braking means capable of applying pressure to the bushing for constricting the slots and compressing the subset portions together to apply prevailing torque to the gear means.

19. A headlamp adjuster mechanism as defined in claim 18 wherein the bushing is keyed into the gear means.

* * * * *